3,178,259
NITRIDED ELECTRODE PROCESS OF PREPARING URANIUM MONONITRIDE
Ellis L. Foster, Jr., Powell, and Roy W. Endebrock, Columbus, Ohio, assignors to the United States of America as represented by the United States Atomic Energy Commission
Filed May 28, 1963, Ser. No. 284,305
5 Claims. (Cl. 23—14.5)

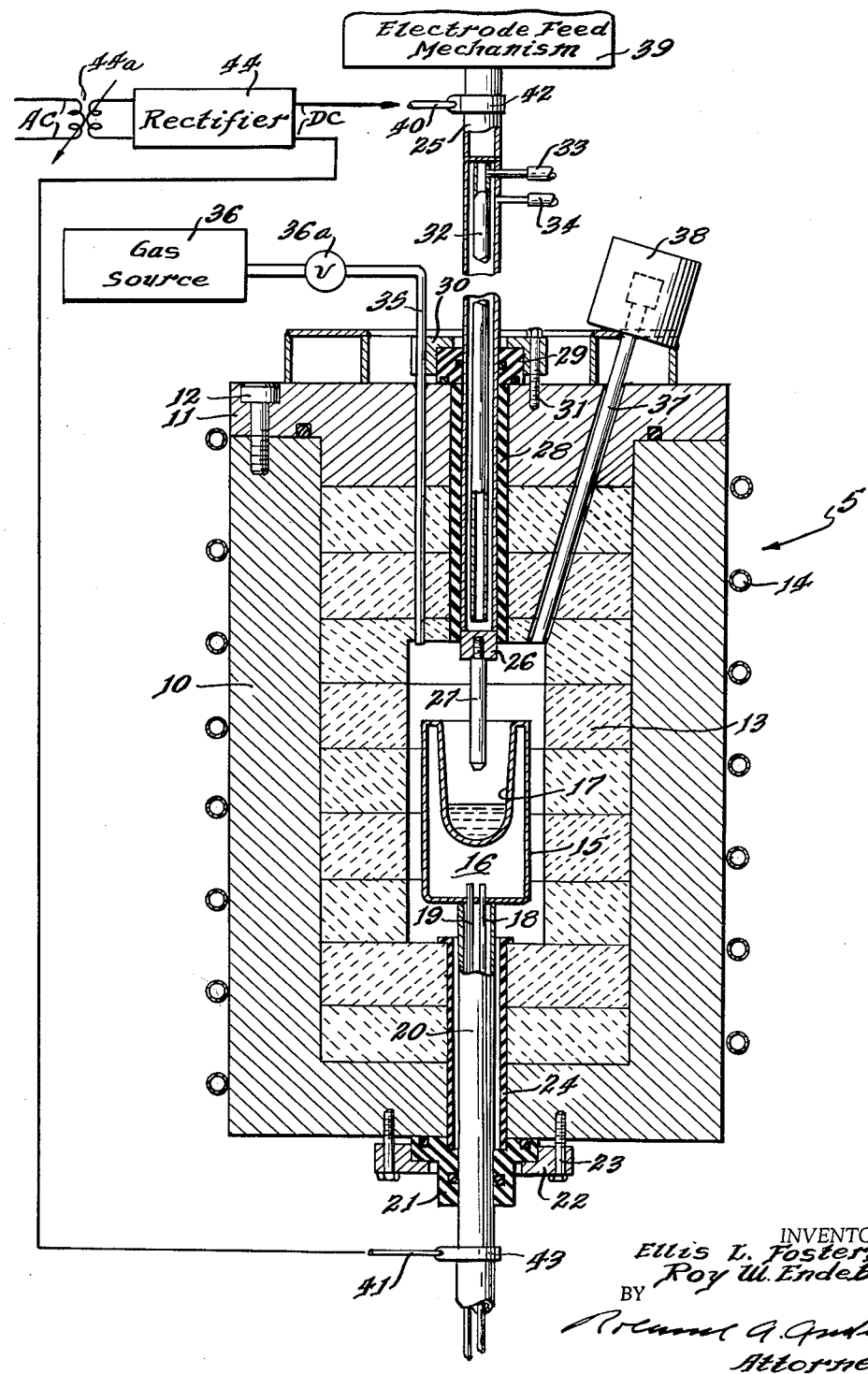

The invention relates to a novel method of preparing uranium mononitride, more particularly of preparing urainum mononitride of sufficient purity and on a sufficiently large scale as to make it a practicable fuel or blanket material in nuclear reactors, and to an apparatus for carrying it out.

Uranium mononitride has properties recommending its use as a fuel or blanket material in a nuclear reactor. Among these are a high melting point, high density, high uranium concentration, and chemical inertness.

The reaction by which uranium mononitride is produced from elemental uranium and nitrogen is easily written:

$$2U + N_2 \rightarrow 2UN$$

However, when it is attempted to put this theoretical reaction into practice, difficulties arise. One of these is that of driving the reaction to completion; unreacted uranium metal is found in the product even when the uranium is finely comminuted ahead of time in the form of a powder. At the same time disproportionation takes place since the product also contains higher nitrides such as $U_2N_3$ and $UN_2$. These tend to migrate to the grain boundaries of the UN crystalline structure, and thus tend to weaken it physically. Both these departures from stoichiometry seriously affect the value of the product for reactor use, so that a pure, or nearly pure UN is desired by the reactor industry.

It is, accordingly, the general object of the invention to provide a method of preparing uranium mononitride.

It is a more particular object to provide a method of preparing uranium mononitride of sufficient purity, and in sufficient amounts to be useful as a fuel material in a nuclear reactor.

It is a further object to provide a method of preparing uranium nitride of sufficient purity, and in sufficient amounts to be useful as a blanket material in a nuclear reactor.

Other objects will appear as the description proceeds.

The foregoing objects are attained by a process which we have invented, which has been named the nitrided electrode process. Pure uranium metal is made a consumable electrode of an electric arc in an electric furnace having a nitrogen atmosphere. The arc is first run at a reduced amperage which is sufficient to form a thin layer, or skin, of nitride over the entire exposed outer surface of the uranium electrode, but not sufficient to cause nitriding to any substantial distance beneath the surface or to cause melting. After the skin of nitride has been formed the amperage is increased to a value where nitriding penetrates beneath the surface of the bottom of the electrode and thus causes it to be consumed and converted to UN which falls to the floor of the furnace in a pool; at the same time the nitride skin along the sides of the nitrided electrode prevents melted metal from escaping out the side, thereby eliminating the unreacted uranium which has always been found commingled with the product in previous attempts to produce UN in an electric arc.

Our nitrided electrode also acts to eliminate the higher nitride impurities which have always been produced by previous electric arc processes. We believe this to be explained in that the skin of nitride, by preventing molten metal from breaking out the sides of the electrode concentrates the heat at the tip of the electrode, and thus localizes the heat to this limited region of the furnace; this localization reduces the total amount of heat of the process, and this, in turn, reduces the pressure of the nitrogen within the furnace, which is hermetically sealed while in operation. Because of the decreased nitrogen pressure, the higher nitrides are not formed, and the result is a UN product which is perfectly stoichiometric, or at least stoichiometric within very small limits. While we believe that the foregoing explanation is correct, we do not wish to be rigorously bound by it; in any event, we have found that the higher nitrides are eliminated when UN is made by our process, and our discovery is therefore offered empirically on this basis.

Reference is now made to the drawings, the only figure of which is a sectional side view of an apparatus for carrying out the invention. The numeral 5 designates a reaction furnace generally consisting of an outer pressure vessel 10 with a cover 11 secured to the vessel 10 by a plurality of bolts, one of which is shown at 12. In the preferred embodiment here shown the pressure vessel 10 is of right circular cylindrical shape and made of hardened steel.

Within the pressure vessel 10 is a refractory ceramic lining 13, in the preferred embodiment here shown of firebrick, and on its exterior is a cooling coil 14.

Near the center of the furnace 5 is a crucible 15 having an inner coolant space 16 and a product holding well 17. Coolant inlet line 18 delivers coolant, in the present preferred embodiment, water, into the coolant space 16, and coolant outlet line 19 removes it. Crucible 15 is constructed of a metal able to withstand the temperature of the furnace, and which does not react with the product of the reaction within it; in the preferred embodiment here shown crucible 15 is of copper.

Crucible 15 is held in place by electrically conductive crucible support 20, in the present preferred embodiment a metal tube, and this, in turn, is held within furnace 5 by insulating collar 21 in conjunction with annular flange 22 and a plurality of bolts 23 through the latter into the bottom of the pressure vessel 10. Insulating sleeve 24 is coaxial with crucible support 20, and spaced therefrom radially as shown.

Coming through the cover 11 and lining 13 is electrode holder 25, having at its lower end grip 26 in which is held metallic uranium electrode 27. Electrode holder 25 is electrically conductive and fits snugly and slideably within insulating sleeve 28 and insulating collar 29, the latter being held in place by flange 30, which, in turn, is bolted to the cover 11 by a plurality of bolts, one of which is shown at 31. Electrode holder 25 has a coaxial coolant line 32 within it leading almost to the grip 26, and connected at its upper end to coolant inlet line 33. Coolant outlet line 34 carries coolant away from the interior of holder 25 at a slightly lower level than line 33 as shown. The coolant used in the preferred embodiment here shown is water.

Also entering the furnace 5 through the cover 11 and lining 13 is gas line 35, leading from a gas source 36 through valve 36a. It is to be understood that the gas source 36 includes means of transferring gas into the furnace 5 under superatmospheric pressure such as a compressor, and that valve 36a is able to seal the furnace 5 hermetically while in operation. A gas exit, or bleed line with a valve similar to valve 36a is not shown due to the sectioning of the view.

Also entering the furnace 5 through the cover 11 and lining 13 is sighting tube 37, leading from sighting mechanism housing 38. It is understood that appropriate instruments such as a camera, an optical pyrometer and the like may be placed in housing 38. In the present preferred embodiment there are two such sighting tubes, but only one is shown due to the sectioning of the view.

Associated with electrode holder 25 from above is electrode feed mechanism 39. Such mechanisms are well known in the art and act to raise and lower holder 25 manually or automatically.

Current to form an arc between electrode 27 and crucible 15 is supplied by conductors 40 and 41 through collars 42 and 43 on electrode holder 25 and crucible support 20, respectively. In the preferred embodiment here shown the current is direct; conductor 40 communicates with the negative terminal of rectifier 44, thereby making electrode 27 the cathode of the arc within furnace 5. Conductor 41 communicates with the positive terminal of rectifier 44, thereby making the crucible 15 the anode of the arc of furnace 5. Amperage and volatge are regulated by variable transformer 44a between rectifier 44 and a source of A.C. current (not shown).

In carrying out the process of the invention an electrode 27 of uranium metal is inserted in the grip 26. The electrode may be of any diameter up to a half an inch; above this the pressure of the melted metal becomes too great for the nitride skin to contain it. Theoretically there is no lower limit to the thickness of the electrode, but, of course, as a practical matter it would be inadvisable to use a very thin electrode since the amount of product produced would be small. Our preferred diameter is a quarter of an inch for a solid rod electrode. A tubular electrode can have a greater over-all diameter since the hollowed-out volume reduces the pressure on the nitride skin.

The interior of the furnace 5 is then purged of air by introducing nitrogen through gas line 35 and permitting the valve of the bleed line to remain open. The bleed line valve is then closed, and the nitrogen is forced into the furnace under superatmospheric pressure. The pressure of the nitrogen at the start should be no greater than 300 p.s.i.g. and at least 250 p.s.i.g.; our preferred starting pressure is 280 p.s.i.g. With this starting pressure our process will not cause the maximum pressure to exceed about 350 p.s.i.g. at any time, thereby avoiding formation of higher nitrides.

The time, amperage, and other conditions that are required to produce the skin of nitride on the electrode varies somewhat according to the size and shape of the electrode and the cooling arrangements of the furnace. In general, the better the cooling the greater the amperage that can be used without danger of melting; a shallow water-cooled crucible 15, for example, does not permit of as great an amperage as a deep one, and since a quarter inch electrode cools more readily than a half inch electrode, greater amperage may be used with the former. Thus, for a water-cooled crucible one and a half inches deep a quarter inch electrode should be surface-nitrided at about 50 amperes and 100 volts for about 5 minutes. In the case of a water-cooled crucible 2½ inches deep the surface-nitriding may be carried out at as high as 100 amperes. In any event, the amperage should not be much lower than 50 amperes, since below this the arc is apt to become intermittent, which leads to poor results.

Once the electrode has been prepared by the surface-nitriding just described, the amperage may be raised to bring about the main reaction of converting the interior of the mass of the electrode to UN. Again, the dimensions of the electrode and the cooling arrangements are important in determining the conditions. For an electrode a quarter inch in diameter and a water-cooled crucible 1½ inches deep the amperage may be as high as 150 amperes at 100 volts during most of the reaction, although it is well to make the transition from the 50 amperes of the surface nitriding stage to the larger value in increments, rather than in a single step.

When a water-cooled crucible 2½ inches deep is used the surface nitriding may be carried out at about 100 amperes at about 100 volts for a shorter time, from about one to about five minutes, and preferably for about two minutes. This produces a skin of sufficient strength for a quarter inch diameter electrode; for an electrode of greater diameter a thicker skin of nitride should be built up by increasing the nitriding time. The amperage then used during the main reaction may be as high as 160 amperes at 100 volts, with good results.

Subsidiary to the foregoing, we have found that certain additives improve the physical properties of UN castings. Metals of the class consisting of niobium, vanadium, zirconium, iron and nickel are suitable as such additives. Of these iron, nickel and niobium reduce voids within the casting and inhibit higher nitride formation. Such additives are added to the UN in the range of from about 0.2 to 4.0 weight percent, based on the weight of the whole.

*Example I*

A solid, right cylindrical uranium electrode 5 inches long and a quarter of an inch in diameter was inserted in the grip 26 of an apparatus of the type shown in the figure and above described. The crucible 15 was of copper, water-cooled, and had a well 17 one and one-half inches deep. The apparatus was purged of air with nitrogen, the valve on the bleed line closed, the nitrogen pressure increased to 240 p.s.i.g. and the valve 36a closed to make the furnace 5 a hermetically sealed vessel. A direct current was then passed from the crucible 15 as the anode to the uranium electrode as cathode in accordance with the following schedule, the voltages used being shown in the first column to the left, the amperages in the next column, the gauge pressure in the next column, and the time in minutes during which these conditions prevailed for the respective parameters on the same horizontal line in the right hand column:

| Volts | Amps. | P.s.i.g. | Time (Min.) |
| --- | --- | --- | --- |
| 100 | 150 | 240–250 | 5 |
| 100 | 120 | 260 | 3½ |
| 100 | 200 | 260 | 8 |
| 100 | 220 | 260 | 5 |
| 100 | 240 | 260 | 5 |
| 90 | 250 | 300 | 4 |
| 100 | 160 | 280 | 2 |
| 100 | 170 | 280 | 4 |

At the conclusion of this process the product in the well 17 was examined. It had obvious cracks and voids and a chemical analysis showed it to have only 4.95% nitrogen, or 0.61% short of the stoichiometric amount of 5.56%. This represents a departure from stoichiometry of about 11% which is considered serious.

*Example II*

In an attempt to overcome the nitrogen deficiency produced by the process of Example I, an electrode of the same size was placed in the same apparatus and the initial nitrogen pressure was raised to 330 p.s.i.g. The following schedule, similar to the schedule in Example I was used:

| Volts | Amps. | P.s.i.g. | Time (Min.) |
|---|---|---|---|
| 100 | 50 | 330–350 | 5 |
| 100 | 100 | 350 | 3 |
| 100 | 150 | 350 | 1½ |
| 100 | 100 | 350 | 2 |
| 100 | 150 | 350–400–320 | 11 |

The product was examined and found to have visible cracks and higher nitrides.

*Example III*

The procedure of Example II was followed except that the initial nitrogen pressure was lowered to 280 p.s.i.g., and the following schedule was used:

| Volts | Amps. | P.s.i.g. | Time (Min.) |
|---|---|---|---|
| 100 | 50 | 280–300 | 5 |
| 100 | 100 | 300 | 3 |
| 100 | 150 | 350–260 | 18 |

The product of this process was a sound, coherent ingot of substantially stoichiometric UN, free from cracks and other physical imperfections.

*Example IV*

The procedure of the previous examples was followed except that the crucible 15 having a well 17 one and one-half inches deep was removed and a new crucible substituted having a well two and one-half inches deep. The following schedule was used, the times in this, and in all succeeding examples, being the time elapsed from a zero time at the start of the experiment, rather than time elapsed during the various stages, as in the preceding schedules:

| Volts | Amps. | P.s.i.g. | Time (Min.) |
|---|---|---|---|
| 100 | 120 | 280 | 0 |
| 100 | 160 | 290 | 2 |
| 100 | 160 | 300 | 17 |
| 100 | 160 | 290 | 84 |
| 0 | 0 | 230 | 86 |

The UN product produced by the process was a casting of excellent appearance, free from cracks and other defects, and substantially stoichiometric. It was noted that the arc was extremely stable during this operation and that rise in pressure while it was in progress was very small.

*Example V*

The same procedure was followed as in Example IV, with the following schedule:

| Volts | Amps. | P.s.i.g. | Time (Min.) |
|---|---|---|---|
| 100 | 100 | 280 | 0 |
| 100 | 160 | 285 | 2 |
| 100 | 160 | 280 | 67 |
| 0 | 0 | 240 | 68 |

The product of this process was a UN casting of excellent appearance, free of cracks and other defects, with a substantially uniform grain, and substantially stoichiometric.

*Example VI*

The object of the process of this example was to ascertain whether the general method of the previous examples could be interrupted and resumed without producing an inferior product characterized by a zone of high nitrides and cracks. The procedure of Examples IV and V was followed according to the following schedule:

| Volts | Amps. | P.s.i.g. | Time (Min.) |
|---|---|---|---|
| 100 | 100 | 280 | 0 |
| 100 | 160 | 300 | 2 |
| 100 | 160 | 260 | 81 |
| 0 | 0 | 230 | 81.5 |

The process was interrupted and then resumed according to the following schedule, beginning with a second zero time:

| Volts | Amps. | P.s.i.g. | Time (Min.) |
|---|---|---|---|
| 100 | 100 | 280 | 0 |
| 100 | 100 | 325 | 1 |
| 100 | 160 | 330 | 5 |
| 100 | 160 | 305 | 50 |
| 0 | 0 | 260 | 50.5 |
| 0 | 0 | 240 | 55 |

The product consisted of a bottom button of UN and a top button of UN that broke apart easily. Both were of excellent appearance and substantially stoichiometric.

*Example VII*

The object of this example was to further investigate the process of the previous examples. The same procedure as in Examples IV, V, and VI was followed according to the following schedule, the time given being the time elapsed from zero time as in Example VI:

| Volts | Amps. | P.s.i.g. | Time (Min.) |
|---|---|---|---|
| 100 | 100 | 285 | 0 |
| 100 | 100 | 300 | 1 |
| 100 | 100 | 300 | 2 |
| 100 | 100 | 300 | 5 |
| 100 | 160 | 299 | 5.2 |
| 100 | 160 | 297 | 7 |
| 100 | 160 | 300 | 9 |
| 100 | 160 | 302 | 17 |
| 100 | 160 | 301 | 22 |
| 100 | 160 | 303 | 25 |
| 100 | 160 | 303 | 32 |
| 100 | 160 | 305 | 34 |
| 100 | 100 | 300.5 | 48 |
| 0 | 0 | 295 | 48.5 |
| 0 | 0 | 287 | 50 |
| 0 | 0 | 285 | 54 |

The product of this process was exceptionally smooth, coherent and fine grained, its grain structure being uniform throughout and free from defects. It was substantially stoichiometric and free of higher nitrides.

It will be understood that this invention is not to be limited to the details given herein, but that it may be modified within the scope of the appended claims.

What is claimed is:

1. A method of producing substantially stoichiometric uranium mononitride, comprising cathodically reacting a uranium metal mass with substantially pure elemental nitrogen at a rate such that a skin of uranium mononitride is formed over the entire exposed surface of the metal mass while leaving the interior of the mass unaffected, and then cathodically reacting the metal with substantially pure elemental nitrogen at an increased rate whereby the interior of the metal mass is converted to uranium mononitride.

2. A method of making substantially pure uranium mononitride, comprising making a mass of uranium metal one of the electrodes of an electric arc within an enclosure, filling the enclosure with substantially pure elemental nitrogen, passing an electric current through the uranium metal electrode of a sufficient first magnitude to produce an electric arc and cover the entire exposed surface of the said electrode with a skin of uranium mononitride while leaving the interior thereof unaffected, and then increasing the current to a second magnitude whereby the said interior is converted to uranium mononitride.

3. The method of claim 2 where the current is direct and the uranium electrode is cathodic.

4. The method of claim 2 where the first magnitude is about 50 to 100 amperes and the second magnitude is from about 100 to about 160 amperes.

5. In the method of producing coherent bodies of uranium mononitride, wherein a uranium metal mass is made an electrode of an electric arc in an atmosphere of substantially pure nitrogen, the improvement consisting of operating the arc at an initial low amperage sufficient to form a skin of uranium mononitride over the entire exposed surface of the uranium metal mass while leaving its interior unaffected, and then operating the arc at an increased amperage whereby the interior of said metal mass is converted to uranium mononitride.

References Cited by the Examiner

UNITED STATES PATENTS

| | | | |
|---|---|---|---|
| 2,167,976 | 8/39 | Hanson | 204—327 |
| 2,358,620 | 9/44 | Bousman et al. | 204—327 |
| 2,446,780 | 8/48 | Newton | 23—14.5 |
| 2,544,277 | 3/51 | Newton et al. | 23—14.5 |

OTHER REFERENCES

Harrington et al.: "Uranium Production Technology," D. Van Nostrand Co., New York, 1959, pages 432–435.

Katz et al.: "The Chemistry of Uranium," McGraw-Hill Book Co., Inc., New York, 1951, pages 232–241.

Prideaux et al.: "A Text-Book of Inorganic Chemistry," vol. VI, Part I, Charles Griffin and Co., Limited, London, 1928, page 47.

CARL D. QUARFORTH, *Primary Examiner.*

REUBEN EPSTEIN, *Examiner.*